June 15, 1965 W. McMURRAY 3,189,748

FREQUENCY RESPONSIVE POWER AMPLIFIER

Original Filed April 26, 1960

3 Sheets-Sheet 1

Inventor:
William McMurray,
by Paul A. Frank
His Attorney.

Inventor:
William McMurray,
by Paul A. Frank
His Attorney.

FREQUENCY RESPONSIVE POWER AMPLIFIER

Original Filed April 26, 1960

Inventor:
William McMurray,
by Charles W. Helzer
His Attorney.

United States Patent Office 3,189,748
Patented June 15, 1965

3,189,748

FREQUENCY RESPONSIVE POWER AMPLIFIER

William McMurray, Ballston Lake, N.Y., assignor to General Electric Company, a corporation of New York Original application Apr. 26, 1960, Ser. No. 24,743. Divided and this application May 26, 1961, Ser. No. 112,953
5 Claims. (Cl. 307—41)

The present invention relates to a new and improved power amplifier and to a frequency reference circuit comprising a part of the power amplifier; and is a division of my copending application Serial No. 24,743, filed April 26, 1960.

More specifically, the invention relates to a power amplifier having a new and improved frequency reference circuit and to the utilization of such circuit in speed control systems, overspeed detectors, and the like.

Presently available speed control systems for the most part employ some generating device such as a tachometer for generating an electrical signal whose frequency is a function of the speed desired to be measured. This signal is then supplied to a frequency discriminating circuit that develops an output error signal representative of deviations of the frequency of the input signal from a desired value, and the output error signal is then applied through a power amplifier to some speed controlling device. As a consequence, speed control systems of this type are relatively complex, and their relative complexity necessarily involves some sacrifice in their response characteristic. The present invention was evolved to obviate some of the difficulties inherent in the design of present day speed control systems.

It is, therefore, a primary object of the present invention to provide a new and improved frequency reference circuit which comprises a part of a power amplifying circuit that has a relatively fast response to changes in frequency of an input signal supplied to the circuit.

In practicing the invention a power amplifier circuit is provided that includes a frequency reference circuit comprised by a resonant circuit which includes the primary winding of a saturable transformer and which is tuned to a desired reference frequency. The power amplifier further includes a silicon controlled rectifier having its control gate element coupled to the secondary winding of the saturable transformer. A load device is connected in circuit relationship with the master controlled rectifier, with the circuit thus formed being adapted to be coupled across a source of alternating current. Connected in circuit relationship with the master controlled rectifier is a charging device whereby the level to which the charging device is charged is determined by the period of conduction of the master silicon controlled rectifier during one-half cycle of the alternating current supply. And a slave controlled rectifier is connected in circuit relationship with the load device, and has its gate element operatively coupled to the charging device whereby the charging device renders the slave controlled rectifier conductive for a time period during the remaining half cycle of the alternating current supply which is dependent upon the charge on the charging device.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
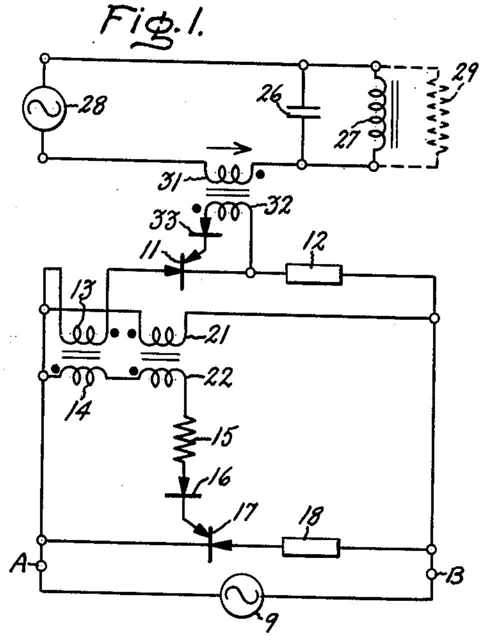
FIGURE 1 is a schematic circuit diagram of a master-slave amplifier constructed in accordance with the invention, and illustrates a new and improved frequency reference circuit that can be employed in driving a master-slave amplifier circuit of this type.

FIGURE 1 is the schematic circuit diagram of a speed control circuit employing as a part thereof a frequency reference circuit comprised by a tuned resonant circuit including a capacitor 26 and a linear inductor 27 connected in parallel circuit relationship across a source of alternating current supply 28. The parallel tuned circuit further includes some finite value of resistance indicated by the dotted line resistor 29 and is connected in series with the primary winding 31 of a first saturable core transformer. The saturable core transformer has its secondary winding 32 connected through an isolating diode 33 to the control gate element of a master silicon controlled rectifier 11.

The silicon controlled rectifier 11 is connected in a push-pull master-slave amplifier circuit which includes a first load device 12 connected in series circuit relationship with the master silicon controlled rectifier 11 and the primary winding 13 of a second saturable core transformer. The series circuit thus comprised is connected across a source of alternating current potential 9. A slave silicon controlled rectifier 17 is connected in series circuit relationship with a second load device 18 across the source 9 in parallel with the first mentioned series circuit. The gate control element of the slave controlled rectifier 17 is connected to a gate excitation circuit which includes the secondary winding 14 of the second saturable core transformer connected in series circuit with a secondary winding 22 of a voltage step-down transformer whose primary winding 21 is connected across the source of alternating current supply 9. The excitation circuit comprised in part by the two secondary windings 14 and 22 further includes a current limiting resistor 15 and isolating diode 16 that is connected to the gate control element of the slave controlled rectifier.

Figure 3:
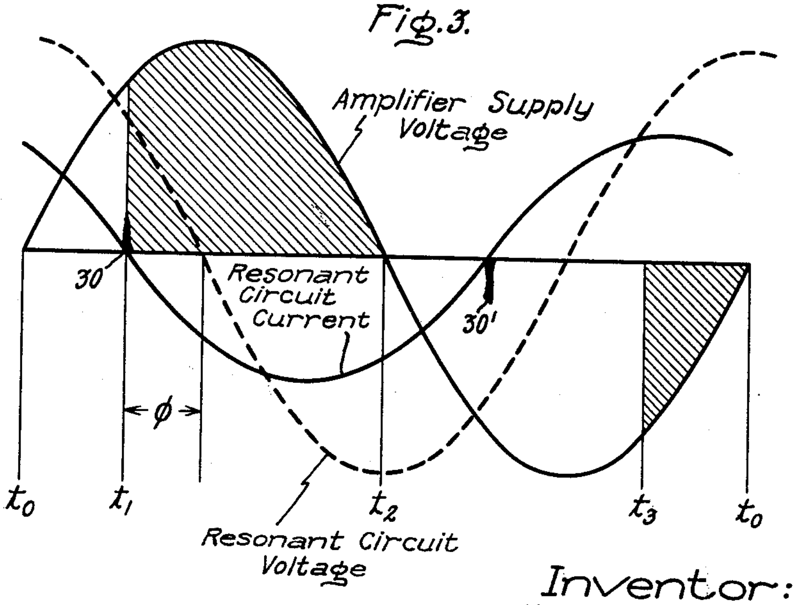
FIGURE 3 is a voltage and current versus time characteristic curve of a frequency reference circuit constructed in accordance with the invention and illustrates the manner in which the circuit operates to develop a control firing pulse for application to a master-slave amplifier circuit.

In operation, the relative phase of the two alternating current supply potentials 28 and 9 is adjusted to have the relation shown in FIGURE 3 of the drawings wherein the dotted curve represents the resonant circuit voltage 28 and as indicated leads the amplifier supply voltage 9 by 90°. It can be appreciated, therefore, that the two alternating current supply voltages 9 and 28 have the same frequency but are shifted in phase 90° with respect to each other. The resonant circuit is tuned to resonate at the desired operating frequency of the source 28, which, for example, may be 1600 cycles per second. The current will differ in phase from the voltage across this circuit by some phase angle $\phi$ which is dependent upon the actual operating frequency. By appropriate design of the first saturable core transformer 31, 32, the current flowing in the reference circuit during each half cycle of the alternating current supply voltage 28 will be adequate to drive the core into either positive or negative saturation so that at the end of each half cycle of current a trigger pulse, indicated at 30, will be produced in the secondary winding 32. It can be appreciated, therefore, that when the alternating current supply voltage 28 is of precisely the proper phase relation with respect to the alternating current supply voltage 9, a current pulse will be produced at time $t_1$ which will trigger on the master silicon controlled rectifier 11 in the push-pull master-slave amplifier circuit.

Figure 9:
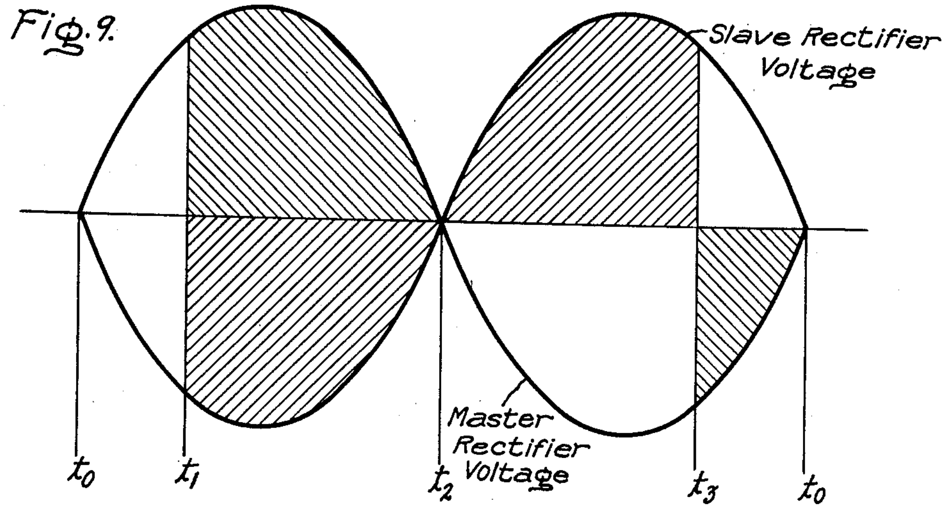
FIGURE 9 is a plot of the amplifier supply voltage versus time characteristic for the circuit shown in FIGURE 1.
Figure 10:
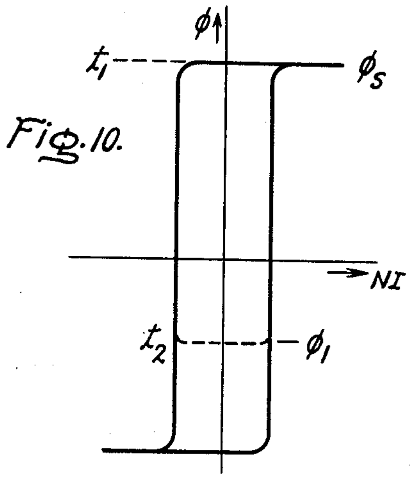
FIGURE 10 is a hysteresis plot of the core of the saturable transformer that comprises a part of the circuit of FIGURE 1.

The manner in which the master-slave silicon controlled rectifiers function as a push-pull power amplifier using the single input control pulse developed by the frequency reference circuit can best be appreciated in connection with FIGURES 9 and 10 of the drawings. When the polarity of the alternating current supplied to the circuit of FIGURE 1 is such that the terminal A is positive and the terminal B is negative, the master controlled rectifier 11 will hold off current flow through the load element 12 until such time that a positive control pulse is applied to the control gate element of the rectifier from the secondary winding 32 of the saturable core transformer which fires the master controlled rectifier. This condition of operation is illustrated schematically by the voltage-time characteristic curve illustrated in FIGURE 9. From an examination of FIGURE 9, it can be appreciated that from time $t_0$ to time $t_1$ the supply potential across rectifier 11 will be increasing in a positive direction until at time $t_1$ the current induced in secondary winding 32 fires the master controlled rectifier 11. Concurrently, it can be appreciated that the supply voltage across the slave controlled rectifier 17 is increasing in the negative direction with respect to its positive electrode, hence, this rectifier is not conditioned to become conductive. Upon the master controlled rectifier 11 being rendered conductive, load current will be drawn through the load device 12, and concurrently through the primary winding 13 of the second saturable transformer. The magnetic hysteresis curve of the saturable transformer 13, 14 is illustrated in FIGURE 10 of the drawings, and it is assumed that at times $t_0$ and $t_1$ the saturable transformer is in its positive saturation condition. After time $t_1$ and during the remainder of the period $t_1$ to $t_2$ that master controlled rectifier 11 conducts, the current through the primary winding 13 resets the core of the saturable transformer 13, 14 down the left side of the curve towards negative saturation. At time $t_2$ the alternating current supply voltage passes through zero so that terminal A thereafter is rendered negative, and conduction through the controlled rectifier 11 will be discontinued. The controlled rectifier 11 then assumes its blocking condition and resetting of the core of saturable transformer 13, 14 is arrested at some intermediate point $\phi_1$ along the hysteresis curve of the core. Because the polarity of the alternating current supply voltage reverses at time $t_2$, the positive electrode of the slave controlled rectifier 17 will be enabled so that this rectifier is in a condition to be rendered conductive. However, the saturable transformer whose secondary winding 14 is connected to the control gate element of the slave controlled rectifier 17 will prevent the firing of the slave controlled rectifier at this instance due to the fact that its core has been reset towards negative saturation by the preceding half cycle of the alternating supply voltage. It is therefore necessary that the supply potential applied across the secondary winding 14 first drive the core of the saturable transformer back up the right side of the hysteresis curve shown in FIGURE 10 into positive saturation $\phi_s$ before a positive firing pulse will be applied to the control gate element of the slave controlled rectifier 17. From an examination of the voltage-time characteristic curve of FIGURE 9, it can be appreciated that the period of time $t_2$ to $t_3$ will be required to again set the core to positive saturation. By a comparison of this time period to the time period $t_1$ to $t_2$, it can be appreciated that the time periods are equal because the total magnetic flux supplied in resetting the core towards negative saturation has to be matched by the total magnetic flux supplied in again setting the core to positive saturation before the core saturates, and supplies a positive polarity gating pulse to the control gate element of the slave controlled rectifier 17. From the preceding discussion, it can be appreciated that the saturable transformer 13, 14 in fact constitutes a charging device that is first charged to a predetermined level upon the master controlled rectifier 11 being rendered conductive and conducting load current through the load device 12. The charging device then serves to hold off the firing of the slave controlled rectifier 17 during the succeeding half cycle of the alternating current supply potential until such time that the charge of magnetic flux on the saturable transformer is offset by an equal value but opposite polarity charge applied for an equal period of time, and thereafter, the slave controlled rectifier 17 is allowed to conduct load current through the load device 18. From an examination of the waveform shown in FIGURE 9, it can be appreciated that the load current will be supplied through the load device 12 for a period of time $t_1$ to $t_2$ during one-half cycle of the alternating current supply potential, and that during the succeeding opposite polarity half cycle of alternating current supply potential, load current will be supplied through the load element 18 for a period of time $t_3$ to $t_0$. It can also be appreciated that the two periods of time of load current conduction are complementary in that when summed together they make up a total period of conduction equal to one-half cycle of the operating supply potential. The circuit operates then in unsymmetrical, push-pull fashion although it is supplied from only a single-ended control signal source. Hence, it can be appreciated that the circuit makes available an extremely efficient, low cost, economical push-pull type amplifier capable of operation from a single-ended control source. During operation, the isolating diodes 16 and 33 serve to augment the control gate element of the controlled rectifiers 11 and 17 in preventing the alternating current supply potential from prematurely resetting the core of the saturable transformer 13, 14. Without the isolating diodes 16 and 33 in the control gate element circuit of the controlled rectifiers, leakage current through the gate element may be sufficient to damage the controlled rectifiers or to prematurely reset the saturable transformer 13, 14. The inclusion of the voltage step-down transformer 21, 22 allows the circuit to be operated at lower potential values than would otherwise be the case, and hence, allows the circuit to be built from smaller and cheaper components.

Referring again to FIGURE 3 of the drawings, as the amplifier supply voltage 9 passes through its zero point, conduction through the master controlled rectifier 11 will be discontinued and the polarity of the voltage supplied thereto will be reversed with respect to controlled rectifier 11. Accordingly, upon the current in the frequency reference circuit passing through its zero in going from the negative half cycle to the positive half cycle, indicated at point 30', the trigger pulse produced by the reference circuit will have no effect on the master controlled rectifier 11. Thereafter, the master-slave push-pull amplifier circuit will function in precisely the same manner as described above wherein the saturable transformer 13, 14 will hold off firing of the slave controlled rectifier 17 for the remainder of the period $t_2$ to $t_3$ while the saturable core transformer is being set towards positive saturation by the potential being applied from the secondary winding 22 of the voltage step-down transformer 21, 22. Upon reaching the point $t_3$ the saturable core transformer 13, 14 reaches positive saturation indicated at the point $\phi_s$ and a current pulse will be produced in the gate control circuit which is applied to the gate control element of the slave controlled rectifier 17 causing this rectifier to be rendered conductive. Conduction through the slave controlled rectifier 17 and hence through the load device 18 will then occur for the remainder of the negative half cycle of the alternating supply potential 9, indicated to be from $t_3$ to $t_0$.

The circuit arrangement shown in FIGURE 1 is adapted primarily for use in a speed control system wherein variations in speed of the element being controlled will appear as a variation in the frequency of the reference voltage 28. Variations of this frequency will produce a change in the phase of the current in the resonant circuit to either advance or retard the phase angle at which the master silicon controlled rectifier 11 is fired by the gating pulse 30 relative to source 9. The resultant change in the phase angle of the firing of the master silicon controlled rectifier 11 results in putting greater or smaller amounts of load current through the load device 12 to thereby correct for the discrepancy, and to bring the system back to its correct speed. Because the frequency reference circuit is simple in construction, economical to fabricate, and yet entirely reliable in operation, it provides a greatly improved means for sensing changes in frequency which are related to changes in speed in a speed control system. The reference circuit is ideally adapted for use with the master-slave unsymmetrical, push-pull amplifier since the latter is adapted for use with a single-ended control system and yet provides a push-pull power output. Accordingly, the control system incorporates all of the advantages of both circuits in providing a very sensitive low cost speed control arrangement.

Figure 2:
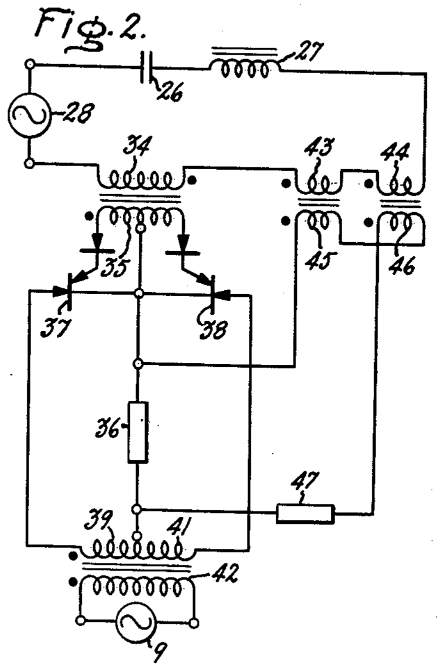
FIGURE 2 is a schematic circuit diagram of still a different form of frequency reference circuit wherein a portion of the load current appearing across the output load of an amplifier being controlled by the circuit is fed back for the purpose of modifying the resonant frequency of the circuit.

A second form of frequency reference circuit constructed in accordance with the invention is shown in FIGURE 2. In this arrangement, a series tuned resonant circuit is formed by a capacitor 26 and a linear inductor 27 connected in series circuit relationship across an alternating current supply voltage source, indicated at 28. The series tuned circuit thus formed is also connected in series circuit relationship with the primary winding 34 of a first saturable transformer and the two secondary winding halves 43 and 44 of an additional saturable transformer. The secondary winding 35 of the first saturable transformer is connected across a full wave rectifier circuit which is conventional in construction, and is comprised by two half wave rectifying circuits coupled together in back-to-back relation across a common load 36. The half wave rectifying circuits are comprised by two silicon controlled rectifiers 37 and 38 with the silicon controlled rectifier 37 being connected across one-half 39 of the secondary winding of an input transformer, and the controlled rectifier 38 being connected across the remaining half 41 of the secondary winding. The primary winding 42 of the input supply transformer has its terminals connected across the source 9 of alternating current voltage. The source 9 and the reference signal source 28 have the same operating frequency, but are shifted in phase 90° with respect to each other in the manner illustrated in the characteristic curve of FIGURE 3. The circuit is completed by the additional saturable transformer having split primary and secondary windings formed by the secondary winding halves 43 and 44 connected in series circuit relationship with the series tuned circuit 26, 27 and the primary winding 34 of the first saturable transformer. The split primary windings 45 and 46 of the additional saturable transformer are inductively coupled to the split secondary windings 43 and 44, respectively, and are connected through a feedback impedance 47 back across the load device 36 in feedback relationship.

In operation, the circuit arrangement of FIGURE 2 functions in a manner similar to that described with relation to FIGURE 1 in that the reference signal supplied from the alternating current source 28 is adjusted so that it leads the supply voltage 9 by 90° and has the same frequency. The circuit is adjusted so that as the current in the tuned circuit 26, 27 including the saturable transformer windings 34, 43, 44 passes through zero, the transformer 34, 35 saturates and produces a current pulse at 30 which will provide a positive gating pulse to the controlled rectifier 37, for example. In the next succeeding half cycle, the firing pulse 30' will serve to fire the controlled rectifier 38 so that essentially full wave rectification is accomplished with respect to the load device 36. The saturable transformer windings 45, 46, which are coupled back across the load device 36 through the impedance 47, serve to feed back a certain portion of the load current into the frequency reference circuit to thereby vary the tuning of the circuit in accordance with the load current being drawn. The effect of this feedback is to change the frequency at which the circuit resonates. The circuit of FIGURE 2 is particularly well adapted for a variable speed control where it is desirable that the circuit operate over a limited range of frequencies. Hence, it is extremely well adapted for use with a speed control system designed to provide for variations of speed within a limited range of speeds. By this arrangement, it is possible to reflect into the frequency of the input signal source 28 a decrease in speed which will produce an increase in the load current due to the advance of the phase angle at which the silicon controlled rectifier 37 or 38 is fired. In the case where the frequency change is to a higher value than the mean value to which the circuit is adjusted to operate, then the change will be in a direction to decrease the load current through the load device 36. This increase or decrease in load current will be reflected in an increase or decrease in the current fed back through the primary windings of the split saturable transformer windings 45 and 46, and will result in a change in the reactance that the transformer reflects into the tuned circuit through the primary windings 43, 44. This change in reactance will effectively change the resonant frequency to which the entire circuit is tuned within the limited range of frequencies at which the circuit will operate. By adjustment of the impedance 47, the amount of current fed back and hence the resonant frequency of the tuned reference circuit are controlled, thereby controlling the speed at which the speed control system will operate.

Figure 4:
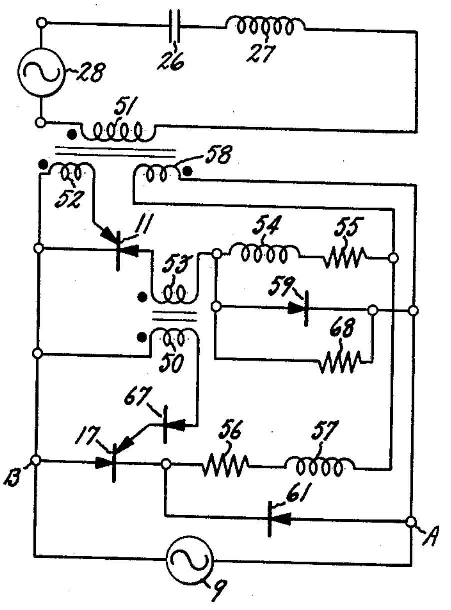
FIGURE 4 is a schematic circuit diagram of still another form of master-slave amplifier circuit constructed in accordance with the invention which is controlled by a novel frequency reference circuit having means incorporated therein for changing the firing angle at which the master circuit is fired.

Another form of speed control circuit constructed in accordance with the invention and which employs negative feedback for speed control purposes is illustrated in FIGURE 4 of the drawings. In the arrangement of FIGURE 4, an alternating current source of control signals 28 is coupled across a frequency reference circuit comprised by a capacitor 26 and an inductor 27 connected in series circuit relationship with the primary winding 51 of a saturable core transformer. The secondary winding 52 of the saturable core transformer is connected to the control gate element of a master silicon controlled rectifier 11. The master silicon controlled rectifier 11 is connected in series circuit relationship with the primary winding 53 of a second saturable core transformer and with an inductive load device 54 and current limiting resistor 55, and this series circuit is connected in parallel circuit relationship with a second series circuit formed by a slave controlled rectifier 17, a limiting resistor 56, and an inductive load device 57. The parallel circuit thus formed has one of its terminals connected to a low impedance bias winding 58 that is inductively coupled to the saturable transformer primary winding 51, and in turn, is connected to one side of the alternating current supply 9, and the remaining terminal of the parallel circuit is connected directly to the alternating current source 9. The slave controlled rectifier 17 is slaved to the master controlled rectifier 11 through the scondary winding 50 of the second saturable transformer and an isolating diode 67. To complete the circuit, a pair of commutating diodes 59 and 61 are connected between one end of each of the inductive load devices 54, 57, respectively, and the terminal of the alternating current supply source 9 to which the D.C. bias winding 58 is connected.

Figure 6:
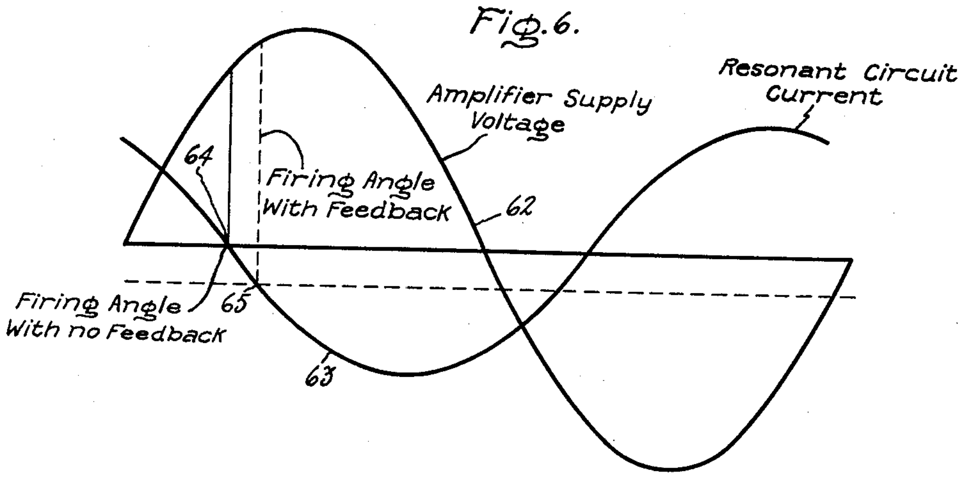
FIGURE 6 is the current-voltage versus time characteristic curve of the circuit shown in FIGURE 4.

In operation, the circuit arrangement of FIGURE 4 functions in a manner similar to the circuit shown in FIGURE 2 in that the frequency reference circuit formed by the series tuned capacitor 26 and inductor 27 in series with the primary winding 51 of the first saturable core transformer will develop a current pulse in the secondary winding of the saturable reactor at the end of each half cycle. During the positive half cycle of the alternating current supply 9, this current pulse serves to fire the master controlled rectifier 11. The voltage-time characteristic curve of the circuit arrangement of FIGURE 4 is illustrated in FIGURE 6 wherein the alternating current supply voltage 9 is shown at 62 and the current through the reference circuit is indicated at 63. Initially, where the current passes through a current zero during the positive half cycle of the alternating current supply voltage at point 64, the master controlled rectifier 11 will be rendered conductive. Upon this occasion, load current will be drawn through the inductive load device 54 and the primary winding 53 of the saturable core transformer. This direct current component will pass through the control winding 58 of the saturable core transformer coupled to the reference circuit so that a small D.C. bias is produced on the core of this transformer. The effect of the D.C. bias is to readjust the phase angle at which firing will occur during the following cycle of operation. This readjustment will be to a new phase angle position such as shown at 65, dependent upon the value of the direct current component, and will be retarded or advanced, depending upon the polarity of the control winding 58. Conduction through the master controlled rectifier 11 will serve to reset the core of the saturable transformer 53 towards negative saturation to a point such as $\phi_1$ shown in FIGURE 10 so that during the next half cycle of the alternating current supply source 9, the core of transformer 53, 50 will have to be set back to positive saturation prior to firing the slave controlled rectifier 17 in the previously described manner. Upon the slave controlled rectifier 17 being rendered conductive, load current will be drawn through the inductive load element 57 and limiting resistor 56 and through the D.C. bias winding 58. This portion of the load current will serve to bias the core of the saturable transformer 51 in a direction to advance or retard the firing angle at which the master controlled rectifier 11 is rendered conductive for succeeding cycles. By appropriate adjustment of the average value of this bias setting, it is of course possible to control the amount of current supplied through the inductive load devices 54 and 57. Following each cycle of conduction through the controlled rectifiers 11 and 17, the commutating diodes 59 and 61, respectively, serve to circulate the reactive component of the load current through the load devices 54 and 57, respectively.

Figure 5:
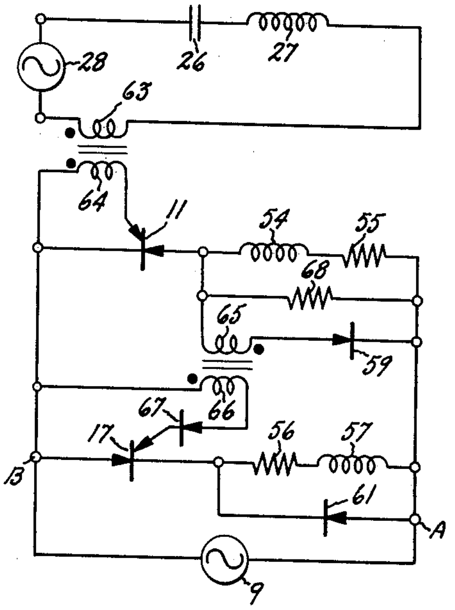
FIGURE 5 is a schematic circuit diagram of another embodiment of a master-slave power control amplifier controlled by a frequency reference circuit constructed in accordance with the invention and intended for use with split inductive loads.

Still a different form of speed control circuit constructed in accordance with the invention is shown in FIGURE 5 and includes a frequency reference circuit comprised by a series connected capacitor 26 and inductor 27 tuned to series resonance in conjunction with the primary winding 63 of a first saturable core transformer. The series circuit thus formed is connected across a source of alternating current reference signals 28. The secondary winding 64 of the saturable core transformer is connected to the control gate element of a master silicon controlled rectifier 11 which, in turn, is connected in series circuit relationship with an inductive load element 54 and limiting resistor 55 across a source of alternating current potential 9. The juncture of the inductive load element 54 and controlled rectifier 11 are connected through the primary winding 65 of a second saturable core transformer whose secondary winding 66 is connected through an isolating diode 67 to the control gate element of the slave controlled rectifier 17. The slave controlled rectifier 17 is connected in series circuit relationship with a current limiting resistor 56 and inductive load element 57 both of which are paralleled by a commutating diode 61. A second commutating diode 59 is connected in series with the primary winding 65 of the second saturable core transformer and a ballast resistor 68 is connected across this circuit. By this arrangement, the reactive component of the load current is recirculated through the inductive load device 54, and is used to reset the saturable transformer 65, 66 toward negative saturation in place of the main component of the load current drawn through the controlled rectifier 11. As a consequence of this arrangement, the saturable transformer 65, 66 is reset during the period of time prior to conduction of the master controlled rectifier 11, the period from time $t_0$ to $t_1$ in FIGURE 9. Hence, the period of time from $t_2$ to $t_3$ during which the saturable transformer 65, 66 is set back to positive saturation, which must be equal in duration to the period of resetting action, is in this instance equal in duration to the period of time $t_0$ to $t_1$. Therefore, the period of time $t_3$ to $t_0$ in which the slave controlled rectifier 17 is conductive is in this instance equal in duration to the period of time $t_1$ to $t_2$ in which the master controlled rectifier 11 is conductive. Thus, the slaving action of the slave controlled rectifier 17 is symmetrical, instead of unsymmetrical, with respect to the master controlled rectifier 11. In other respects, the circuit of FIGURE 5 operates in identical fashion to the circuit arrangement of FIGURE 4 with the exception that there is no feedback provided to control the phase angle at which firing of the master controlled rectifier is accomplished.

Figure 7:
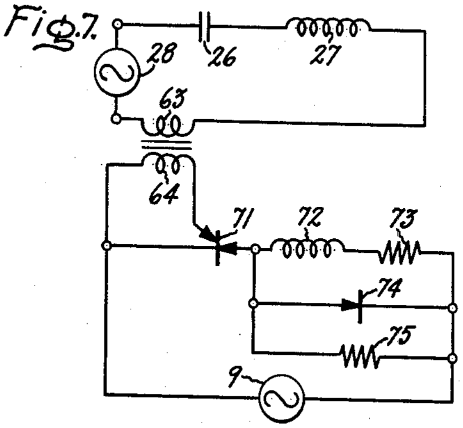
FIGURE 7 is a schematic circuit diagram of an overspeed detector circuit employing as a part thereof the novel reference frequency circuit for developing overspeed output signals.

FIGURE 7 of the drawings illustrates an overspeed detector which employs the novel frequency reference circuit as a component part thereof. The frequency reference circuit is comprised by a capacitor 26 and linear inductor 27 connected in series circuit relationship with the primary winding 63 of a saturable core transformer. The series circuit thus formed is tuned to a desired upper limit of the operating frequency, and is connected across a source 28 of input signals having a normal operating frequency lower than the series resonant frequency of the tuned reference circuit. The secondary winding of the saturable transformer 64 is connected to the control gate element of a controlled rectifier 71 which is connected in series circuit relationship with an inductive load element 72 and a current limiting resistor 73 across an alternating current supply 9 which is in phase with respect to the alternating current supply 28 and has the same operating frequency. A commutating diode 74 and a ballast resistor 75 are connected in parallel circuit relationship across the load element 72 and the current limiting resistor 73.

The circuit arrangement comprised in the above fashion constitutes an overspeed detector and functions in the following manner. At the desired upper limit of the operating frequency, the current and voltage through the in-resonance frequency reference circuit will be in phase, and since the two alternating current sources 9 and 28 have the same frequency and are in phase, the current pulses produced by the saturable transformer 63, 64 will occur each time the supply voltage 9 passes through its zero value so that the controlled rectifier 71 is not enabled to be rendered conductive. Accordingly, as long as the system with which the overspeed detector is used maintains its proper speed limit, no corrective action will be instituted by the circuit. In the event that the frequency drops below the resonant value, a leading current will be developed in the frequency reference circuit and the current through the primary winding 63 of the saturable transformer 63, 64 will increase through zero in advance of the positive swings of the supply voltage. Hence, for underspeed conditions, the polarity of the supply voltage across the silicon controlled rectifier 71 will be such that the circuit will not be rendered operative by the positive gating pulse. However, in the event that the frequency of the source 28 increases above the resonance value, indicating an increase in speed of the system with which the overspeed detector is used above its desired limit value, a lagging current will be produced which will increase through a current zero and thereby produce a triggering pulse subsequent to the supply voltage having passed through its zero value and provided a positive enabling potential across the controlled rectifier 71. On this occasion, the controlled rectifier will be rendered conductive, and will supply load current through a corrective device indicated by the inductive load element 72, assumed to be a relay coil or other element used to correct the overspeed condition.

Figure 8:
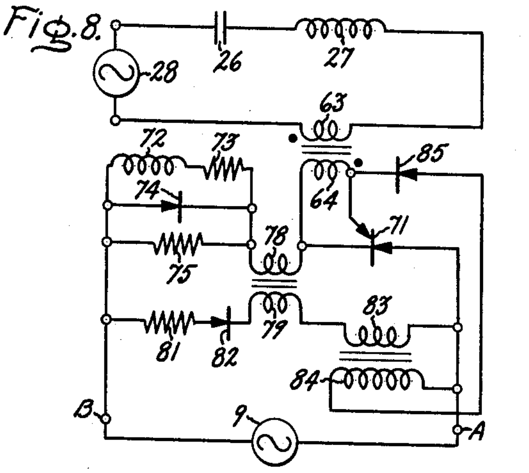
FIGURE 8 is a schematic circuit diagram of an improved form of overspeed detector circuit similar to that shown in FIGURE 7 which incorporates a means for maintaining the value of the output signal developed by the circuit for increasing deviations from a desired reference frequency.

Because the overspeed detector shown in FIGURE 7 has certain undesirable characteristics, namely, that in the event of an overspeed, the maximum value of corrective signal occurs at those overspeeds immediately adjacent the desired limit speed value, and in the event that the overspeed condition increases thereafter the corrective value of the load current developed by the circuit drops off in magnitude. In order to obviate this condition, a second overspeed detector is shown in FIGURE 8 of the drawings which includes a reference frequency circuit formed by a series connected capacitor 26 and inductor 27 and a primary winding 63 of a saturable core transformer which are series tuned to a desired upper limit of the operating frequency, and are connected across the source of reference signals 28 which is representative of the speed of a device being controlled by the circuit. The saturable transformer has its secondary winding 64 connected to the gate control element of a controlled rectifier 71. Controlled rectifier 71, in turn, is connected in series circuit relationship with an inductive load element 72, such as the coil of a relay, and limiting resistor 73 across a source of alternating current supply 9. Also connected in this series circuit is the primary winding 78 of a saturable core transformer whose secondary winding 79 is connected in series circuit with a current limiting resistor 81, a diode 82, and the primary winding 83 of still a third saturable transformer. This third saturable transformer has its secondary winding 84 connected in reverse relationship through an isolating diode 85 back to the control gate element of the controlled rectifier 71. In this circuit arrangement the alternating supply potential 9 and reference signal 28 have the same frequency and are in phase so that as long as the frequency is at its preselected limit value, which is the resonant frequency of the reference circuit, the circuit will not be activated. Similarly, if the speed drops below the desired limiting value, the circuit will not be activated for the previously discussed reasons. However, in the event that the speed of the device being monitored by the circuit, and hence the frequency of the signal 28 increases above the desired limiting value, the current through the reference circuit will lag the potential thereacross sufficiently to pass through its current zero at a time when the potential supplied from the terminals A, B, is positive with respect to the electrodes of the controlled rectifier 71. Upon this occasion, the ensuing gating pulse will render the controlled rectifier conductive for the remainder of the positive going half cycle of the alternating current supply potential 9. Conduction through the controlled rectifier 71 will cause the saturable transformer 78, 79 to be reset down its hysteresis curve to a value such as shown at $\phi_1$ in FIGURE 10 of the drawings. Thereafter, conduction through the controlled rectifier 71 will be terminated as the alternating current voltage from source 9 passes through zero value. During the succeeding half cycle of the alternating current potential 9 when the terminal B goes positive, the rectifier 82 will be rendered conductive and the core of the second saturable transformer 78, 79 will be driven back towards positive saturation. In doing this, however, it should be noted that voltage will be held off of the primary winding 83 of the third saturable transformer 83, 84 so that the core of the transformer will not be reset towards negative saturation, as would normally be the case had controlled rectifier 71 not been fired in the preceding half cycle. Accordingly, during the next succeeding positive half cycle when the terminal A is rendered positive, a positive signal pulse will be applied through secondary winding 84 of the third saturable transformer 83, 84 and through the diode 85 to the control gate element of the controlled rectifier 71 thereby again turning on this controlled rectifier to repeat the cycle. In this manner all succeeding positive half cycles of the alternating current supply potential will result in firing the controlled rectifier 71 and produce successive current flow through the load element 72 thereby providing a steady value corrective signal until such time that the overspeed condition is corrected. Normally, the circuit will not return to its quiescent condition until the overspeed has been corrected by appropriate external action, and the circuit manually reset.

From the foregoing description it can be appreciated that the invention makes available a number of new and improved push-pull amplifiers which employ silicon controlled rectifiers. These amplifiers are capable of being controlled from a single-ended source of control signals which incorporate a unique frequency sensitive reference circuit that is especially adapted for use in speed control systems. Further by simple adaptation of the basic circuits described, it is possible to vary the reference frequency to which such circuits are sensitive, and to employ the circuits in fabrication of overspeed detectors.

Having described several embodiments of the new and improved push-pull amplifier constructed in accordance with the invention, it is believed obvious that other modifications and variations of the invention are possible in the light of the above teaching. It is, therefore, to be understood that changes may be made in the particular embodiments of the invention described which are within the full intended scope of the invention as defined by the appended claims.

What I claim as new and desire to secure by Letters Patent of the United States is:

1. A control circuit including in combination a frequency reference circuit comprising a resonant circuit tuned to a desired reference frequency and adapted to be connected to an alternating current source, said resonant circuit including a first saturable transformer having inductively coupled primary and secondary windings with the primary winding being connected in series circuit relationship with the resonant circuit, a master-slave amplifier controlled by said reference circuit and comprising a master silicon controlled rectifier having its control gate element coupled to the secondary winding of the first saturable transformer, a first load device coupled in series circuit relationship with the master controlled rectifier with the series circuit thus formed being adapted to be connected across a source of alternating current, a second saturable transformer having inductively coupled primary and secondary windings with the primary winding being connected in series circuit relationship with said load and master controlled rectifier, a slave controlled rectifier and a second load device connected in series circuit relationship across the series circuit formed by said master controlled rectifier and said first load device, and a control element firing circuit connected in series circuit relationship with the secondary winding of said second saturable transformer to the control gate element of the slave controlled rectifier.

2. The combination set forth in claim 1 wherein the resonant circuit comprises a series tuned circuit and the first saturable transformer includes an additional winding inductively coupled to the primary winding thereof and connected in series circuit relationship with the load devices in said master-slave amplifier whereby current through the load devices is fed back to the additional winding to change the average magnetic condition of the first saturable transformer to a desired new value.

3. A frequency reference circuit comprising a series resonant circuit tuned to a desired reference frequency and adapted to be connected to an alternating current source and including a saturable transformer having a primary winding connected in series relationship with the resonant circuit and having its secondary connected to the input of an amplifier, an additional saturable transformer having its secondary winding connected in series circuit relationship with the resonant circuit and the primary winding of said first saturable transformer and having its primary winding connected in parallel circuit relationship with the load of said amplifier, said amplifier being controlled by said reference circuit whereby current through the load is fed back to the additional saturable transformer to change the resonant frequency of the reference circuit to a desired new value.

4. A control circuit including in combination a frequency reference circuit comprising a resonant circuit tuned to the desired reference frequency and adapted to be connected to a source of alternating current, said resonant circuit including a first saturable transformer having inductively coupled primary and secondary windings with the primary winding comprising a part of the resonant circuit, a silicon controlled rectifier having its gate control element connected to the secondary winding of said saturable transformer, a load device and a current limiting resistor connected in series circuit relationship with said controlled rectifier, the circuit thus formed being adapted to be connected across a source of alternating current, and a diode rectifier and ballast device connected in parallel circuit relationship across said load device.

5. A control circuit including in combination a frequency reference circuit comprising a resonant circuit tuned to the desired reference frequency and adapted to be connected to a source of alternating current, said resonant circuit including a first saturable transformer having inductively coupled primary and secondary windings with the primary winding comprising a part of the resonant circuit, a silicon controlled rectifier having its gate control element connected to the secondary winding of said saturable transformer, a load device connected in series circuit relationship with the controlled rectifier across a source of alternating current, a second saturable transformer having inductively coupled primary and secondary windings with the primary winding being connected in series circuit relationship with the load device and the silicon controlled rectifier, a third saturable transformer having inductively coupled primary and secondary windings with the primary winding being connected in series circuit relationship with the secondary winding of the second saturable transformer and blocking diode across the source of alternating current, and with the secondary winding of the third saturable transformer being connected back to the gate element of the controlled rectifier through an isolating device.

References Cited by the Examiner

UNITED STATES PATENTS

| | | | |
|---|---|---|---|
| 2,003,945 | 6/35 | Logan. | |
| 2,851,099 | 9/58 | Snoddy | 307—41 |
| 2,898,545 | 8/59 | Bird | 323—76 |
| 2,960,613 | 11/60 | Spitzer | 323—76 |
| 3,005,110 | 10/61 | Elam | 307—41 |

LLOYD McCOLLUM, *Primary Examiner.*

MILTON O. HIRSHFIELD, *Examiner.*